US012107263B2

(12) United States Patent
Chae et al.

(10) Patent No.: US 12,107,263 B2
(45) Date of Patent: Oct. 1, 2024

(54) NEGATIVE ELECTRODE INCLUDING FIRST NEGATIVE ELECTRODE ACTIVE MATERIAL LAYER AND SECOND NEGATIVE ELECTRODE ACTIVE MATERIAL LAYER HAVING POLYMER COATING LAYER ON A SURFACE OF THE SECOND NEGATIVE ELECTRODE ACTIVE MATERIAL AND LITHIUM, METHOD OF PRODUCING THE SAME AND LITHIUM SECONDARY BATTERY INCLUDING THE SAME

(71) Applicant: LG CHEM, LTD., Seoul (KR)

(72) Inventors: Oh Byong Chae, Daejeon (KR); Sang Wook Woo, Daejeon (KR); Je Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 838 days.

(21) Appl. No.: 16/982,343

(22) PCT Filed: Mar. 18, 2019

(86) PCT No.: PCT/KR2019/003146
§ 371 (c)(1),
(2) Date: Sep. 18, 2020

(87) PCT Pub. No.: WO2019/203455
PCT Pub. Date: Oct. 24, 2019

(65) Prior Publication Data
US 2021/0036314 A1  Feb. 4, 2021

(30) Foreign Application Priority Data
Apr. 17, 2018  (KR) ........................ 10-2018-0044541

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0402* (2013.01); *H01M 4/364* (2013.01);
(Continued)

(58) Field of Classification Search
CPC .... H01M 4/366; H01M 4/0402; H01M 4/364; H01M 4/386; H01M 4/587
(Continued)

(56) References Cited

U.S. PATENT DOCUMENTS 10,497,934 B2   12/2019  Park et al.
2002/0006551 A1  1/2002   Ryu et al.
(Continued)

FOREIGN PATENT DOCUMENTS

CN   103022414 A       4/2013
CN   103378347 A   *  10/2013
(Continued)

OTHER PUBLICATIONS

International Search Report issued in PCT/KR2019/003146 (PCT/ISA/210), dated Jun. 21, 2019.

*Primary Examiner* — Sean P Cullen
(74) *Attorney, Agent, or Firm* — Birch, Stewart, Kolasch & Birch, LLP

(57) ABSTRACT

A negative electrode for a lithium secondary battery, a method of producing the negative electrode, a method of producing a pre-lithiated negative electrode by pre-lithiation of the negative electrode, and a lithium secondary battery including the negative electrode. The negative electrode can increase the capacity of a battery and improve the electrochemical performance by securing the initial reversibility of (Continued)

a negative electrode by pre-lithiation, and allow lithium ions to be diffused into a negative electrode active material layer during pre-lithiation without being lost.

3 Claims, 2 Drawing Sheets

(51) Int. Cl.
  *H01M 4/04* (2006.01)
  *H01M 4/38* (2006.01)
  *H01M 4/587* (2010.01)
  *H01M 10/0525* (2010.01)

(52) U.S. Cl.
  CPC ........... *H01M 4/386* (2013.01); *H01M 4/587* (2013.01); *H01M 10/0525* (2013.01); *H01M 2004/027* (2013.01)

(58) Field of Classification Search
  USPC ...... 429/212, 221, 223, 231.2, 231.3, 231.5, 429/231.8, 231.95
  See application file for complete search history.

(56) References Cited

U.S. PATENT DOCUMENTS

| | | |
|---|---|---|
| 2006/0228468 A1 | 10/2006 | Lain et al. |
| 2009/0061321 A1 | 3/2009 | Yakovleva et al. |
| 2011/0262812 A1 | 10/2011 | Han et al. |
| 2014/0205907 A1 | 7/2014 | Kang et al. |
| 2014/0295267 A1 | 10/2014 | Wang |
| 2015/0380728 A1* | 12/2015 | Son .................. H01M 4/13 252/502 |
| 2017/0117542 A1 | 4/2017 | Park et al. |
| 2017/0149052 A1 | 5/2017 | Yakovleva et al. |
| 2017/0288211 A1* | 10/2017 | Zhamu .................. H01M 4/386 |
| 2017/0294643 A1 | 10/2017 | Burshtain et al. |
| 2017/0294644 A1 | 10/2017 | Burshtain et al. |
| 2017/0294648 A1 | 10/2017 | Burshtain et al. |
| 2017/0294649 A1 | 10/2017 | Burshtain et al. |
| 2017/0294680 A1 | 10/2017 | Burshtain et al. |
| 2017/0294681 A1 | 10/2017 | Burshtain et al. |
| 2017/0294687 A1 | 10/2017 | Burshtain et al. |
| 2018/0190985 A1 | 7/2018 | Choi et al. |
| 2018/0212236 A1 | 7/2018 | Jacob et al. |
| 2018/0212239 A1 | 7/2018 | Jacob et al. |
| 2018/0212240 A1 | 7/2018 | Jacob et al. |
| 2018/0261829 A1 | 9/2018 | Yakovleva et al. |
| 2018/0301757 A1 | 10/2018 | Burshtain et al. |
| 2019/0319262 A1* | 10/2019 | Zhamu .................. H01M 4/624 |

FOREIGN PATENT DOCUMENTS

| | | | | |
|---|---|---|---|---|
| CN | 105742813 A | | 7/2016 | |
| CN | 108129315 A | | 11/2016 | |
| CN | 106410120 A | | 2/2017 | |
| CN | 100900849 A | | 7/2017 | |
| CN | 107068972 A | * | 8/2017 | |
| CN | 107403820 A | | 11/2017 | |
| CN | 107644980 A | | 1/2018 | |
| CN | 107799721 A | | 3/2018 | |
| JP | 2002-246020 A | | 8/2002 | |
| JP | 2005-38720 A | | 2/2005 | |
| JP | 2008-305746 A | | 12/2008 | |
| JP | 2014-103052 A | | 6/2014 | |
| JP | 2018-156361 A | | 8/2015 | |
| JP | 2015232921 A | * | 12/2015 | ............ H01M 4/13 |
| KR | 10-2000-0032795 A | | 6/2000 | |
| KR | 10-2006-0073934 A | | 6/2006 | |
| KR | 10-2010-0081304 A | | 7/2010 | |
| KR | 10-1031920 B1 | | 5/2011 | |
| KR | 10-2012-0093487 A | | 8/2012 | |
| KR | 10-2014-0006967 A | | 1/2014 | |
| KR | 10-2014-0070261 A | | 6/2014 | |
| KR | 10-1563901 B1 | | 10/2015 | |
| KR | 10-2015-0134945 A | | 12/2015 | |
| KR | 10-2016-0087121 A | | 7/2016 | |
| KR | 10-2017-0048184 A | | 5/2017 | |
| KR | 10-2017-0058798 A | | 5/2017 | |
| KR | 10-2017-0075661 A | | 7/2017 | |
| KR | 10-1790392 B1 | | 10/2017 | |

* cited by examiner

NEGATIVE ELECTRODE INCLUDING FIRST NEGATIVE ELECTRODE ACTIVE MATERIAL LAYER AND SECOND NEGATIVE ELECTRODE ACTIVE MATERIAL LAYER HAVING POLYMER COATING LAYER ON A SURFACE OF THE SECOND NEGATIVE ELECTRODE ACTIVE MATERIAL AND LITHIUM, METHOD OF PRODUCING THE SAME AND LITHIUM SECONDARY BATTERY INCLUDING THE SAME

CROSS-REFERENCE TO RELATED APPLICATION

This application claims priority to and the benefit of Korean Patent Application No. 10-2018-0044541 filed in the Korean Intellectual Property Office on Apr. 17, 2018, the entire contents of which are incorporated herein by reference.

TECHNICAL FIELD

The present invention relates to a negative electrode for a lithium secondary battery, a method of producing the negative electrode, a method of producing a pre-lithiated negative electrode by pre-lithiation of the negative electrode, and a lithium secondary battery including the negative electrode. Specifically, the present invention relates to a negative electrode for a lithium secondary battery which can increase the capacity of a battery and improve electrochemical performance by securing the initial reversibility of a negative electrode by pre-lithiation, and which can allow lithium ions to be diffused into the negative electrode active material layer during pre-lithiation without being lost, a method of producing the negative electrode and a lithium secondary battery including the negative electrode.

BACKGROUND ART

As technology development and demand for mobile devices increase, there is a rapid increase in demand for secondary batteries as energy sources. Among such secondary batteries, lithium secondary batteries, which exhibit high energy density and operating potential, a long cycle life and a low self-discharge rate, have been commercialized and widely used.

Meanwhile, a metal oxide such as $LiCoO_2$, $LiMnO_2$, $LiMn_2O_4$ or $LiCrO_2$ is used as a positive electrode active material forming a positive electrode of the lithium secondary battery, and lithium metal, a carbon-based material such as graphite, activated carbon or the like, a material such as silicon oxide ($SiO_x$) or the like is used as a negative electrode active material forming a negative electrode. Among the above-mentioned negative electrode active materials, lithium metal was mainly used in the beginning, but as charging and discharging cycles progress, lithium atoms are grown on the surface of the lithium metal, resulting in damage to a separator and a battery, and thus carbon-based materials have been mainly used recently. However, in the case of carbon-based materials, since a theoretical capacity is only about 400 mAh/g, there is a disadvantage of small capacity. Thus, various studies have been made to replace the carbon-based material with a silicon (Si)-based material having a high theoretical capacity (4,200 mAh/g) as a negative electrode active material.

The lithium secondary battery is charged and discharged while lithium ions of a positive electrode active material of a positive electrode are intercalated into/deintercalated from a negative electrode active material of a negative electrode.

Theoretically, lithium intercalation and deintercalation reactions into and from the negative electrode active material are completely reversible, but actually more lithium than the theoretical capacity of the negative electrode active material is consumed, and only a part of the lithium is recovered during discharge. Therefore, after the second cycle, a smaller amount of lithium ions are intercalated during charging, but almost all the intercalated lithium ions are deintercalated during discharging. The difference in capacity exhibited in the first charging and discharging reactions is referred to as irreversible capacity loss. Since commercialized lithium secondary batteries are manufactured in a state in which lithium ions are supplied from the positive electrode and lithium is not present in the negative electrode, it is important to minimize irreversible capacity loss in initial charging and discharging.

This initial irreversible capacity loss is known to be caused mainly by an electrolyte decomposition reaction on the surface of the negative electrode active material, and a solid electrolyte interface (SEI) is formed on the surface of the negative electrode active material by an electrochemical reaction through electrolyte decomposition. The formation of the SEI has a problem of causing irreversible capacity loss because a lot of lithium ions are consumed therefor, but the SEI formed at the beginning of charging prevents the reaction of lithium ions with the negative electrode or other materials during charging and discharging, and serves as an ion tunnel to pass only lithium ions, thereby further curbing a decomposition reaction of an electrolyte and contributing to the improvement of cycle characteristics of lithium secondary batteries.

Therefore, there is a need for a method for improving the initial irreversible capacity loss caused by the formation of the SEI and the like. One of the methods is to perform pre-lithiation before manufacturing a lithium secondary battery so that side reactions that occur during the first charging are experienced in advance. As described above, in the case in which pre-lithiation is performed, when charging and discharging is performed on an actually manufactured secondary battery, there is an advantage that the initial irreversible capacity loss can be reduced because the first cycle proceeds in a state in which irreversible capacity loss is reduced.

Examples of the conventional pre-lithiation method include a method of depositing lithium on the negative electrode and a method of directly contacting the lithium with the negative electrode. For example, a lithiated material layer may be formed on the negative electrode active material layer for pre-lithiation, and the lithiated material is vulnerable to oxidation and can be easily oxidized when exposed to moisture or oxygen.

Accordingly, there is a demand for development of a new negative electrode for a lithium secondary battery capable of achieving more effective pre-lithiation.

RELATED ART

Patent Document

KR2014-0070261 A

DISCLOSURE

Technical Problem

An object of the present invention is directed to providing a negative electrode for a lithium secondary battery which can secure the initial reversibility of the negative electrode, and allow lithium ions to be diffused into a negative electrode active material without being lost due to moisture or an oxidizing action or the like, a method of effectively producing the negative electrode and a lithium secondary battery including the negative electrode.

Technical Solution

In order to achieve the object, the present invention provides a negative electrode for a lithium secondary battery which includes: a negative electrode current collector; a first negative electrode active material layer on a surface of the negative electrode current collector and including a first negative electrode active material; and a second negative electrode active material layer on a surface of the first negative electrode active material layer and including a second negative electrode active material, and a polymer coating layer on a surface of the second negative electrode active material, wherein the second negative electrode active material layer further includes lithium.

The polymer coating layer may include one or more selected from the group consisting of polymethyl methacrylate, polyvinyl alcohol, polyacrylic acid, polyethylene, polypropylene, polyethylene terephthalate, polycarbonate, polyacrylate, polyethylene naphthalate, polyethersulfone and polysulfone.

The first negative electrode active material and second negative electrode active material may each independently be one or more negative electrode active materials selected from the group consisting of (a) a carbon-based material; (b) one or more selected from the group consisting of Si, Sn, Al, Sb, Zn, and oxides thereof; and (c) metal oxides selected from the group consisting of $Co_{x1}O_{y1}$ ($1 \le x1 \le 3$, $1 \le y1 \le 4$), $Ni_{x2}O_{y2}$ ($1 \le x2 \le 3$, $1 \le y2 \le 4$), $Fe_{x3}O_{y3}$ ($1 \le x3 \le 3$, $1 \le y3 \le 4$), $TiO_2$, $MoO_2$, $V_2O_5$ and $Li_4Ti_5O_{12}$.

Specifically, the first negative electrode active material may include a mixture of a silicon-based negative electrode active material and a carbon-based negative electrode active material, in which a weight ratio of the silicon-based negative electrode active material to the carbon-based negative electrode active material is 1:99 to 50:50.

The second negative electrode active material may include one or more selected from the group consisting of lithiated graphene, lithiated silicon, and lithiated graphite.

Further, the present invention provides a negative electrode for a lithium secondary battery, which includes: a negative electrode current collector; a first negative electrode active material layer on a surface of the negative electrode current collector and including a first negative electrode active material; and a second negative electrode active material layer on a surface of the first negative electrode active material layer and including a second negative electrode active material, and a polymer coating layer on a surface of the second negative electrode active material, wherein the first negative electrode active material layer includes lithium, and the lithium is diffused in a lithium ion form or is present in a form combined with the first negative electrode active material, and wherein the second negative electrode active material layer further includes lithium.

Further, the present invention provides a method of producing the negative electrode for a lithium secondary battery, which includes steps of: forming a first negative electrode active material layer including a first negative electrode active material on a surface of negative electrode current collector; forming a polymer coating layer on a surface of a second negative electrode active material; and forming a second negative electrode active material layer on a surface of the first negative electrode active material layer, which second negative electrode active material layer includes the second negative electrode active material having the surface on which the polymer coating layer is formed, wherein the second negative electrode active material layer further includes lithium.

Further, the present invention provides a method of producing the negative electrode for a lithium secondary battery including steps of: forming a first negative electrode active material layer including a first negative electrode active material on a surface of a negative electrode current collector; forming a polymer coating layer on a surface of a second negative electrode active material; forming a second negative electrode active material layer on a surface of the first negative electrode active material layer, which second negative electrode active material layer includes the second negative electrode active material having the surface on which the polymer coating layer is formed, wherein the second negative electrode active material layer further includes lithium; and impregnating the resulting negative electrode with a pre-lithiation solution to be pre-lithiated so that lithium is contained in the first negative electrode active material layer.

The impregnation may be carried out at a temperature in a range of 10° C. to 200° C. for 2 hours to 48 hours.

Further, the present invention provides a lithium secondary battery including the negative electrode for a lithium secondary battery.

Advantageous Effects

In the negative electrode according to the present invention including the first negative electrode active material layer containing lithium and the second negative electrode active material layer on which the polymer coating layer is formed, the second negative electrode active material is resistant to moisture or oxidation due to being coated with the polymer coating layer, so that the lithium ions diffused into the first negative electrode active material layer may not be lost during later pre-lithiation. Furthermore, the pre-lithiated negative electrode according to the present invention can secure the initial reversibility of the negative electrode to improve the electrochemical performance of the lithium secondary battery.

MODES OF THE INVENTION

Figure 1:
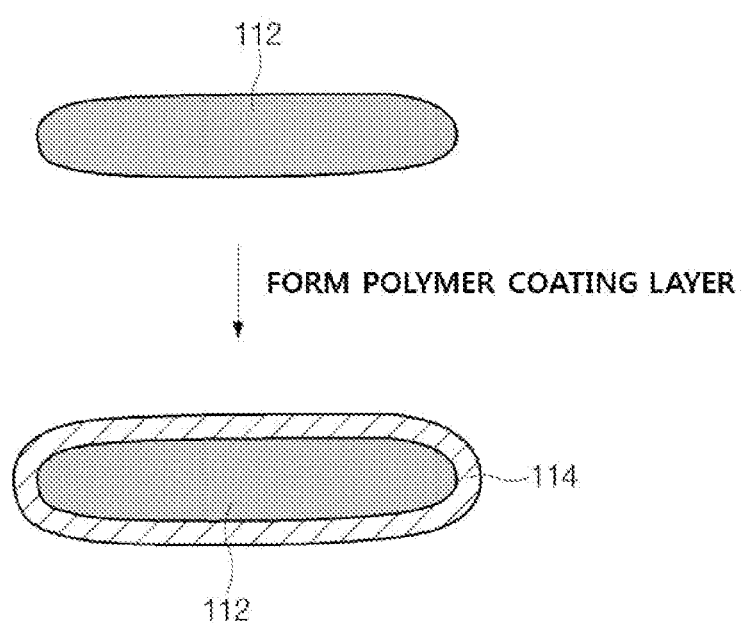
FIG. 1 is a view illustrating the formation of a polymer coating layer on a second negative electrode active material.

Hereinafter, the present invention will be described in further detail.

Terminology used in the specification and claims should not be construed as limited to conventional or literal meanings, and should be construed as having meanings and concepts corresponding to the technical idea of the present invention based on the principle in which the inventor can suitably define the concept of a term to explain his own invention by the most preferable method.

Negative Electrode

A negative electrode according to the present invention includes:

a negative electrode current collector; a first negative electrode active material layer formed on the negative electrode current collector and including a first negative electrode active material; and a second negative electrode active material layer formed on the first negative electrode active material layer and including a second negative electrode active material having a surface on which a polymer coating layer is formed, wherein the second negative electrode active material layer contains lithium.

Examples of the polymer include polymethyl methacrylate (PMMA), polyvinyl alcohol (PVA), polyacrylic acid (PAA), polyethylene (PE), polypropylene (PP), polyethylene terephthalate (PET), polycarbonate (PC), polyacrylate (PAR), polyethylene naphthalate (PEN), polyethersulfone (PES), polysulfone (PS), etc.

The first negative electrode active material and second negative electrode active material may each independently be one or more materials selected from the group consisting of a carbon-based material; one or more selected from the group consisting of Si, Sn, Al, Sb, and Zn, or oxides thereof; and metal oxides selected from the group consisting of $Co_{x1}O_{y1}$ ($1 \leq x1 \leq 3$, $1 \leq y1 \leq 4$), $Ni_{x2}O_{y2}$ ($1 \leq x2 \leq 3$, $1 \leq y2 \leq 4$), $Fe_{x3}O_{y3}$ ($1 \leq x3 \leq 3$, $1 \leq y3 \leq 4$), $TiO_2$, $MoO_2$, $V_2O_5$ and $Li_4Ti_5O_{12}$.

Specifically, the first negative electrode active material as a silicon-based negative electrode active material includes silicon (Si), a silicon-based alloy, silicon oxide ($SiO_x$, $0<x\leq2$) or the like.

Meanwhile, the first negative electrode active material layer may further include a carbon-based negative electrode active material such as artificial graphite, natural graphite, graphitized carbon fiber, and amorphous carbon in addition to the silicon-based negative electrode active material. In this case, the first negative electrode active material layer may include a silicon-based negative electrode active material and a carbon-based negative electrode active material in a weight ratio of 1:99 to 50:50, and preferably 5:95 to 20:80.

When the silicon-based negative electrode active material is contained in the range below the above-described range, it is difficult to increase the energy density of the battery, and thus it is difficult to achieve high capacity of the battery. When the amount of the silicon-based negative electrode active material exceeds the above-described range, the degree of volume expansion of the negative electrode may be increased.

Further, the second negative electrode active material may be lithiated graphene, lithiated silicon or lithiated graphite.

The negative electrode for a lithium secondary battery is a negative electrode before pre-lithiation. The lithium of the second negative electrode active material may be diffused into the first negative electrode active material through a pre-lithiation process.

The negative electrode pre-lithiated as above according to the present invention includes: a negative electrode current collector; a first negative electrode active material layer formed on the negative electrode current collector and including a first negative electrode active material; and a second negative electrode active material layer formed on the first negative electrode active material layer and including a second negative electrode active material having a surface on which a polymer coating layer is formed, wherein the first negative electrode active material layer contains lithium therein, and the lithium is diffused in a lithium ion form or is present in a form combined with the first negative electrode active material, and the second negative electrode active material layer contains lithium.

In the pre-lithiated negative electrode, lithium which is present in the second negative electrode active material layer in the negative electrode before pre-lithiation is diffused into the first negative electrode active material so that the lithium is diffused in a lithium ion form or is present in a form combined with the first negative electrode active material.

Method of Producing Negative Electrode

Figure 2:
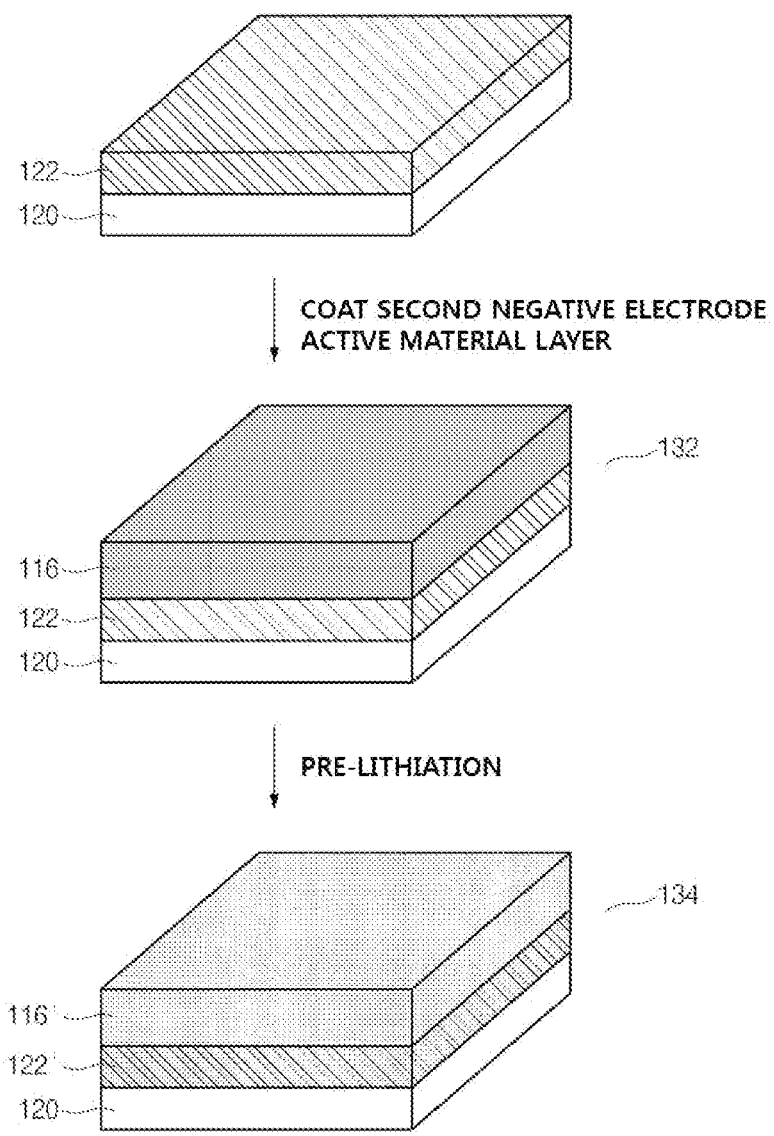
FIG. 2 is a simplified view showing a process of producing the negative electrode of the present invention.

A method of producing a negative electrode for a lithium secondary battery according to the present invention includes steps as below (see FIGS. 1 and 2).

First, a negative electrode 132 before pre-lithiation among negative electrodes for a lithium secondary battery according to the present invention is produced by the following steps: forming a first negative electrode active material layer 122 including a first negative electrode active material on a negative electrode current collector 120; forming a polymer coating layer 114 on a surface of a second negative electrode active material 112; and forming a second negative electrode active material layer 116, which includes the second negative electrode active material 112 having a surface on which the polymer coating layer 114 is formed and contains lithium, on the first negative electrode active material layer 122.

Further, a method of producing a pre-lithiated negative electrode for a lithium secondary battery 134 according to the present invention is produced by the following steps: forming a first negative electrode active material layer 122 including a first negative electrode active material on a negative electrode current collector 120; forming a polymer coating layer 114 on a surface of a second negative electrode active material 112; forming a second negative electrode active material layer 116, which includes the second negative electrode active material 112 having a surface on which the polymer coating layer 114 is formed and contains lithium, on the first negative electrode active material layer 122; and impregnating the negative electrode 132, in which the first negative electrode active material layer 122 and the second negative electrode active material layer 116 are formed on the negative electrode current collector 120, with a pre-lithiation solution to be pre-lithiated so that lithium is contained in the first negative electrode active material layer.

The first negative electrode active material layer 122 may be formed by dissolving or dispersing the first negative electrode active material, a conductive material and/or a binder in a solvent to prepare a negative electrode composite material, applying the negative electrode composite material onto at least one surface of the negative electrode current collector, and drying and pressing the negative electrode composite material, or may be formed by casting the negative electrode composite material on a separate support and laminating a film separated from the support on the negative electrode current collector.

The second negative electrode active material layer 116 may be formed by dissolving or dispersing the second negative electrode active material 112 on which the polymer coating layer 114 is formed, a conductive material and/or a binder in a solvent to prepare a negative electrode composite material, applying the negative electrode composite material onto at least one surface of the negative electrode current collector, and drying and pressing the negative electrode composite material, or may be formed by casting the negative electrode composite material on a separate support and laminating a film separated from the support on the negative electrode current collector, and the second negative electrode active material layer 116 contains lithium.

The negative electrode current collector is not particularly limited as long as it has high conductivity without causing chemical changes in the battery. For example, copper, stainless steel, aluminum, nickel, titanium, calcined carbon, copper or stainless steel which is surface-treated with carbon, nickel, titanium, silver or the like, an aluminum-cadmium alloy, or the like may be used. Further, the negative electrode current collector may generally have a thickness of 3 μm to 500 μm, and fine irregularities may be formed on the current collector surface to enhance the binding force of the negative electrode active material. For example, the negative electrode current collector may be used in various forms such as a film, a sheet, a foil, a net, a porous body, a foam, a nonwoven fabric, etc.

The first and second negative electrode active materials may each be contained in an amount of 80 to 99 wt %, and more particularly, in an amount of 85 to 98 wt % based on the total weight of the first and second negative electrode active material layers. When the content is in the above-described range, excellent capacity characteristics can be exhibited.

The conductive material is used for imparting conductivity to an electrode, and is not particularly limited as long as it has electronic conductivity without causing chemical changes in the corresponding battery. The conductive material is used for further enhancing conductivity of the electrode active material. Specific examples thereof may include graphite such as natural graphite or artificial graphite; carbonaceous materials such as carbon black, acetylene black, KETJEN BLACK® (carbon black), channel black, furnace black, lamp black, thermal black or carbon fiber; powders or fibers of metals such as copper, nickel, aluminum, and silver; conductive whiskers such as zinc oxide or potassium titanate; conductive metal oxides such as titanium oxide; conductive polymers such as polyphenylene derivatives and the like, and any one or a mixture of two or more thereof may be used. The conductive material may be included in an amount of 1 wt % to 30 wt % based on the total weight of the negative electrode active material layer.

Further, the binder serves to enhance the cohesion between the negative electrode active material particles and the binding force between the negative electrode active material and the current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinyl pyrrolidone, polytetrafluoroethylene, polyethylene, polypropylene, an ethylene propylene diene polymer (EPDM), a sulfonated EPDM, a styrene butadiene rubber (SBR), a fluororubber, various copolymers thereof and the like and any one or a mixture of two or more thereof may be used. The binder may be included in an amount of 1 wt % to 30 wt % based on the total weight of the negative electrode active material layer.

Meanwhile, the solvent used in the preparation of the negative electrode composite material may be a solvent commonly used in the related field. For example, dimethyl sulfoxide (DMSO), isopropyl alcohol, N-methylpyrrolidone (NMP), acetone, water or the like may be used alone or in combination. The amount of the solvent to be used may be suitably adjusted in consideration of application thickness of a slurry, production yield, viscosity, etc.

The pre-lithiation solution is a solution containing an ionizable lithium salt and an organic solvent. The negative electrode may be pre-lithiated by being impregnated with the pre-lithiation solution before assembling an electrode assembly, or may be pre-lithiated by an electrolyte solution (corresponding to the pre-lithiation solution) injected after assembling a battery.

The ionizable lithium salt contains $Li^+$ as a cation, and an anion may be selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$ and $(CF_3CF_2SO_2)_2N^-$.

The organic solvent may be one or more selected from the group consisting of a cyclic carbonate-based organic solvent selected from the group consisting of ethylene carbonate, 1,2-butylene carbonate, 2,3-butylene carbonate, 1,2-pentylene carbonate, 2,3-pentylene carbonate, vinylene carbonate and fluoroethylene carbonate (FEC); a linear carbonate-based organic solvent selected from the group consisting of dimethyl carbonate, diethyl carbonate, dipropyl carbonate, ethyl methyl carbonate, methyl propyl carbonate and ethyl propyl carbonate; a linear ester-based organic solvent selected from the group consisting of methyl acetate, ethyl acetate, propyl acetate, methyl propionate, ethyl propionate, propyl propionate and butyl propionate.

The pre-lithiation may be performed by impregnating the negative electrode in which the first negative electrode active material layer and the second negative electrode active material layer are formed with a pre-lithiation solution at a temperature in a range of 10° C. to 200° C. for 2 hours to 48 hours, preferably, at a temperature in a range of 20° C. to 70° C. for 13 hours to 36 hours.

When the pre-lithiation temperature and time are less than 10° C. and less than 2 hours respectively, pre-lithiation may not be sufficiently achieved. When the pre-lithiation temperature exceeds 200° C., lithium metal may melt and the shape thereof may not be maintained. Since the pre-lithiation is sufficiently achieved in 48 hours, there is no need to further impregnate the negative electrode.

Pre-lithiation occurs when lithium in the second negative electrode active material layer 116 of the present invention is diffused into the first negative electrode active material layer 122 which is a lower layer through a pre-lithiation process. Thus, a pre-lithiated negative electrode 134 including a first negative electrode active material layer 122' into which lithium ions are diffused by pre-lithiation may be produced.

In the pre-lithiated negative electrode 134, the lithium concentration of the second negative electrode active material layer 116' after pre-lithiation is lower than that of the second negative electrode active material layer 116 before pre-lithiation, and the lithium corresponding to the reduced amount is present in the first negative electrode active material layer 122'.

Lithium Secondary Battery

Next, a lithium secondary battery according to the present invention will be described.

The negative electrode produced according to the present invention may be usefully used for the production of lithium secondary batteries.

Specifically, the lithium secondary battery according to the present invention includes a negative electrode, a positive electrode positioned opposite to the negative electrode, a separator interposed between the negative electrode and the positive electrode and an electrolyte. Here, the negative electrode is a negative electrode produced according to the present invention as described above.

Meanwhile, the secondary battery may optionally further include a battery container accommodating the electrode assembly of a positive electrode, a negative electrode, and a separator, and a sealing member sealing the battery container.

The lithium secondary battery may be produced according to a conventional secondary battery production method except that the negative electrode according to the present invention is used.

In the secondary battery, the positive electrode includes a positive electrode current collector and a positive electrode active material layer disposed on at least one surface of the positive electrode current collector.

The positive electrode may be produced according to a conventional positive electrode production method commonly known in the related field. For example, the positive electrode may be produced by dissolving or dispersing components forming the positive electrode active material layer, that is, a positive electrode active material, a conductive material and/or a binder in a solvent to prepare a positive electrode composite material, and applying the positive electrode composite material onto at least one surface of the positive electrode current collector and drying and pressing the positive electrode composite material, or may be produced by casting the positive electrode composite material on a separate support and then laminating a film separated from the support on the positive electrode current collector.

The positive electrode current collector is not particularly limited as long as it has conductivity without causing chemical changes in the battery. For example, stainless steel, aluminum, nickel, titanium, calcined carbon or aluminum or stainless steel which is surface-treated with carbon, nickel, titanium, silver or the like may be used. Further, the positive electrode current collector may generally have a thickness of 3 μm to 500 μm, and fine irregularities may be formed on the current collector surface to enhance the binding force of the positive electrode active material. For example, the positive electrode current collector may be used in various forms such as a film, a sheet, a foil, a net, a porous body, a foam, a nonwoven fabric, etc.

Examples of the positive electrode active material may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ (where y is 0 to 0.33), $LiMnO_3$, $LiMn_2O_3$, $LiMnO_2$ and the like; lithium copper oxide ($Li_2CuO_2$); vanadium oxides such as $LiV_3O_8$, $LiFe_3O_4$, $V_2O_5$, $Cu_2V_2O_7$ and the like; Ni-site type lithium nickel oxides of Formula $LiNi_{1-y}M_yO_2$ (where M=Co, Mn, Al, Cu, Fe, Mg, B, or Ga, and y=0.01 to 0.3); lithium manganese composite oxides of Formula $LiMn_{2-y}M_yO_2$ (where M=Co, Ni, Fe, Cr, Zn, or Ta, and y=0.01 to 0.1), or Formula $Li_2Mn_3MO_8$ (where M=Fe, Co, Ni, Cu, or Zn); $LiMn_2O_4$ wherein a portion of Li is substituted with alkaline earth metal ions; disulfide compounds; $Fe_2(MoO_4)_3$, etc.

Further, the binder and the conductive material may be the same as those described above for the negative electrode.

Meanwhile, in the secondary battery, the separator separates the negative electrode and the positive electrode and provides a path for migration of lithium ions. The separator may be used without any particular limitation as long as it is commonly used as a separator in the secondary battery. In particular, a separator having low resistance against the ion movement of an electrolyte and excellent impregnation of an electrolyte is preferred. Specifically, porous polymer films such as porous polymer films formed of polyolefin-based polymers such as ethylene homopolymers, propylene homopolymers, ethylene/butene copolymers, ethylene/hexene copolymers, ethylene/methacrylate copolymers and the like or a laminated structure having two or more layers thereof may be used. Further, a nonwoven fabric formed of a conventional porous nonwoven fabric, for example, glass fiber with a high melting point, polyethylene terephthalate fiber or the like may be used. Further, a coated separator containing a ceramic component or a polymer material to secure heat resistance or mechanical strength may be used, and may be optionally used as a single layer or a multilayer structure.

Meanwhile, examples of the electrolyte include an organic liquid electrolyte, an inorganic liquid electrolyte, a solid polymer electrolyte, a gel-type polymer electrolyte, a solid inorganic electrolyte, a molten-type inorganic electrolyte and the like which are usable in the production of the secondary battery, but are not limited thereto.

Specifically, the electrolyte may include an organic solvent and a lithium salt.

The organic solvent may be used without limitation as long as it may act as a medium which enables the movement of ions involved in the electrochemical reactions of a battery. Specifically, the organic solvent may be an ester-based solvent such as methyl acetate, ethyl acetate, γ-butyrolactone, ε-caprolactone and the like; an ether-based solvent such as dibutyl ether, tetrahydrofuran or the like; a ketone-based solvent such as cyclohexanone; an aromatic hydrocarbon-based solvent such as benzene, fluorobenzene and the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) and the like; an alcohol-based solvent such as ethyl alcohol, isopropyl alcohol and the like; nitriles such as Ra—CN (wherein Ra is a linear, branched or cyclic C2 to C20 hydrocarbon group and may include a double-bonded aromatic ring or an ether bond); amides such as dimethylformamide; dioxolanes such as 1,3-dioxolane; or sulfolanes, etc. Among them, a carbonate-based solvent is preferred, and a mixture of a cyclic carbonate having high ionic conductivity and a high dielectric constant, such as ethylene carbonate or propylene carbonate, which can increase the charge and discharge performance of the battery, and a linear carbonate-based compound with low viscosity (for example, ethyl methyl carbonate, dimethyl carbonate, diethyl carbonate, etc.) is more preferred. In this case, when the cyclic carbonate and the chain-type carbonate are mixed in a volume ratio of about 1:1 to 9, the performance of the electrolyte may be excellent.

The lithium salt may be used without particular limitation as long as it is a compound capable of providing lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. $LiCl$, $LiI$, or $LiB(C_2O_4)_2$, etc.

The concentration of the lithium salt is preferably within the range of 0.1M to 2.0M. When the concentration of the lithium salt is within the above-described range, the electrolyte has suitable conductivity and viscosity, so that it may exhibit excellent electrolyte performance and the lithium ion may effectively move.

In addition to the above-described electrolyte components, one or more types of additives such as a haloalkylene carbonate-based compound such as difluoroethylene carbonate and the like; or pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinones, N,N-substituted imidazolidines, ethylene glycol dialkyl ethers, ammonium salts, pyrrole, 2-methoxyethanol, aluminum trichloride or the like may be added to the electrolyte for the purpose of improving lifetime characteristics of the battery, suppressing a reduction in battery capacity, and improving discharge capacity of the battery. Here, the additive may be included in an amount of 0.1 wt % to 5 wt % based on the total weight of the electrolyte.

EXAMPLES

Hereinafter, the present invention will be described in detail with reference to examples. However, the following examples are intended to illustrate the present invention and are not intended to limit the present invention.

Example 1

Formation of First Negative Electrode Active Material Layer

A negative electrode active material slurry was prepared by adding 92 wt % of a negative electrode active material (graphite: SiO=7:3), 3 wt % of a conductive agent (DENKA BLACK® (acetylene black)), 3.5 wt % of a binder (SBR) and 1.5 wt % of a thickener (CMC) to water. One surface of a copper current collector was coated with the prepared negative electrode active material slurry, and dried and pressed to form a first negative electrode active material layer on a negative electrode current collector.

Formation of Polymer Coating Layer of Second Negative Electrode Active Material

Toluene, methyl methacrylate (MMA) monomers and dicumyl peroxide (DCP) as an initiator were introduced into a flask, and polymerization was carried out while stirring in an argon atmosphere at 130° C. for 4 hours to prepare PMMA. After polymerization, unreacted monomers and a solvent were removed by filtration and drying. The thus prepared PMMA was dispersed in toluene, and lithiated graphene was added thereto, followed by stirring for 5 hours. After completion of the reaction, the solvent was removed by filtration to prepare lithiated graphene coated with PMMA.

Formation of Second Negative Electrode Active Material Layer

The PMMA-coated lithiated graphene prepared above and PVdF were introduced into a toluene solvent at a weight ratio of 9:1, mixed thoroughly, and the mixture was uniformly applied on the first negative electrode active material layer formed above and dried to form a second negative electrode active material layer.

Impregnation of Electrolyte (Pre-Lithiation)

A pre-lithiation solution was prepared by dissolving 1M-$LiPF_6$ in a solvent in which ethylene carbonate (EC) and diethyl carbonate (DEC) were mixed in a volume ratio of 50:50, and the negative electrode including the first and second negative electrode active material layers prepared was impregnated with the solution.

Here, lithium ions in the PMMA-coated lithiated graphene layer (second negative electrode active material layer) were diffused into the first negative electrode active material layer to proceed pre-lithiation. After 3 hours, the electrode was taken out of the pre-lithiation solution, washed with DMC and dried to produce a pre-lithiated negative electrode.

Production of Lithium Secondary Battery

After the pre-lithiated negative electrode produced above was punched into a coin cell size, a polyolefin separator was interposed between the negative electrode and a lithium metal foil as a counter electrode, and then an electrolyte solution prepared by dissolving 1M $LiPF_6$ in a solvent in which EC and DEC were mixed at a volume ratio of 50:50 was injected to prepare a coin-type half cell.

Example 2

A coin-type half cell was produced in the same manner as in Example 1 except that the polymer coating layer was formed on the second negative electrode active material by using PAA instead of PMMA prepared by polymerizing MMA.

Comparative Example 1

A coin-type half cell was produced in the same manner as in Example 1 except that the lithiated graphene powder used as the second negative electrode active material was not coated with PMMA.

Comparative Example 2

A coin-type half cell was produced in the same manner as in Example 1 except that the PMMA-coated lithiated graphene layer (second negative electrode active material layer) was not formed on the first negative electrode active material layer.

Experimental Example 1. Initial Reversibility Test

The coin-type half cells produced in the Examples and Comparative Examples were subjected to a charge-discharge reversibility test using an electrochemical charging and discharging device. The battery was charged up to a voltage of 0.005 V (vs. $Li/Li^+$) at a current density of 0.1 C-rate during charging, and discharged to a voltage of 1.5 V at the same current density during discharging. At this time, the initial reversibility was determined as the ratio of the charging capacity to the discharging capacity, and the results thereof are shown in the following Table 1.

TABLE 1

|  | Example 1 | Example 2 | Comparative Example 1 | Comparative Example 2 |
|---|---|---|---|---|
| Initial reversibility (%) | 103 | 101 | 97 | 80 |

According to the results shown in Table 1, it can be seen that the reversibility of the Examples is improved compared to that of the Comparative Examples. The initial reversibility efficiency of Comparative Example 1 in which a lithiated graphene layer was applied was improved in comparison with Comparative Example 2 in which the lithiated graphene layer was not applied, but was lower than that of Examples in which the lithiated graphene layer coated with polymers (PMMA and PAA) was applied.

This is because the polymer layer inhibited the oxidation of lithiated graphene (second negative electrode active material) during mixing and electrode coating processes, and thus lithium ions in the graphene were diffused into the first negative active material layer without being lost, thereby it was determined that pre-lithiation was achieved.

BRIEF DESCRIPTION OF REFERENCE NUMERALS

112: second negative electrode active material
114: polymer coating layer
120: negative electrode current collector
122: first negative electrode active material layer (before pre-lithiation)
116: second negative electrode active material layer (before pre-lithiation)
122': first negative electrode active material layer after pre-lithiation
116': second negative electrode active material layer after pre-lithiation
132: negative electrode before pre-lithiation
134: negative electrode after pre-lithiation

The invention claimed is:

1. A negative electrode for a lithium secondary battery, comprising:
a negative electrode current collector;
a first negative electrode active material layer on a surface of the negative electrode current collector and comprising a first negative electrode active material; and
a second negative electrode active material layer adjacent to a surface of the first negative electrode active material layer and comprising a second negative electrode active material, and a polymer coating layer on a surface of the second negative electrode active material,
wherein the first negative electrode active material comprises a mixture of a silicon-based negative electrode active material and a carbon-based negative electrode active material, in which a weight ratio of the silicon-based negative electrode active material to the carbon-based negative electrode active material is 1:99 to 50:50,
wherein the second negative electrode active material layer further comprises lithium,
wherein the second negative electrode active material consists of lithiated graphene, and
wherein the polymer coating layer comprises one or more selected from the group consisting of polymethyl methacrylate, polyvinyl alcohol, polyacrylic acid, polyethylene, polypropylene, polyethylene terephthalate, polycarbonate, polyacrylate, polyethylene naphthalate, polyethersulfone and polysulfone.

2. A lithium secondary battery, comprising the negative electrode for a lithium secondary battery of claim 1.

3. A method of producing the negative electrode for the lithium secondary battery of claim 1, comprising the steps of:
forming the first negative electrode active material layer comprising the first negative electrode active material on the surface of the negative electrode current collector;
forming the polymer coating layer on the surface of the second negative electrode active material; and
forming the second negative electrode active material layer on the surface of the first negative electrode active material layer, which the second negative electrode active material layer comprises the second negative electrode active material having the surface on which the polymer coating layer is formed, wherein the second negative electrode active material layer further comprises lithium.

* * * * *